United States Patent [19]

Soula et al.

[11] 3,928,470

[45] Dec. 23, 1975

[54] PREPARATION OF 2-NITROHALOPHENOLS

[75] Inventors: Gerard Soula, Meyzieu; Jacques Metzger; Louis Lena, both of Marseille, all of France

[73] Assignee: Rhone-Progil, Courbevoie, France

[22] Filed: Apr. 1, 1974

[21] Appl. No.: 456,881

[30] Foreign Application Priority Data

Apr. 6, 1973 France................................ 73.13606

[52] U.S. Cl...... 260/622 R; 260/623 R; 260/624 R; 260/629
[51] Int. Cl.$^2$.......................................... C07C 79/26
[58] Field of Search........ 260/622, 623, 629, 622 R, 260/623 R, 624 R

[56] References Cited
UNITED STATES PATENTS

| | | | |
|---|---|---|---|
| 2,196,580 | 4/1940 | Smith et al............................ | 260/622 |
| 2,644,015 | 6/1953 | Barlett................................ | 260/623 |
| 2,866,816 | 12/1958 | Heywood............................. | 260/521 |
| 2,872,461 | 2/1959 | Mattner.............................. | 260/396 |
| 3,471,577 | 10/1969 | Haubein et al. ..................... | 260/623 |

OTHER PUBLICATIONS

Weininger "Cent. Organic Chemistry" (1972) pp. 68–70.

Moron et al., "Principles of Physical Chemistry" 1958 pp. 454–455.

*Primary Examiner*—James O. Thomas, Jr.
*Assistant Examiner*—W. B. Lone
*Attorney, Agent, or Firm*—Bacon & Thomas

[57] ABSTRACT

The polyhalonitrobenzenes bearing but a single halogen atom at either, but not both, of those molecular sites ortho to the nitro substituent thereof, are dehalohydroxylated to form their corresponding 2-nitrohalophenols in the presence of an ortho orienting liquid organic reaction medium.

14 Claims, No Drawings

PREPARATION OF 2-NITROHALOPHENOLS

BACKGROUND OF THE INVENTION

1. Field of the Invention

The present invention relates to a process for the preparation of certain 2-nitrohalophenols by the dehalohydroxylation of certain polyhalonitrobenzenes, and, more especially, relates to the process for the preparation of certain 2-nitrohalophenols by reacting certain polyhalonitrobenzenes with certain hydroxyl rich saponification agents capable of dehalohydroxylating the said reactant polyhalonitrobenzenes. The dehalohydroxylation reaction is necessarily effected in an organic solvent, which solvent directly influences the ortho selectivity of the nucleophilic aromatic substitution of a single hydroxy moiety for that halogen atom borne by the reactant benzene compound at a position ortho to its nitro substituent.

2. Description of the Prior Art

Various processes for the synthesis of the halo-nitrophenols are of course well known in the art. For example, one such method comprises dehydrohydroxylation of a halonitrobenzene with a strong base. It will be appreciated that this particular method does not involve a diminution in the number of halogen atoms borne by the benzene basic nucleus. Another method for the preparation of the halonitrophenols comprises dehalohydroxylating a polyhalonitrobenzene, also with a strong base, but in the presence of an aqueous reaction medium. The primary disadvantage of this second method is that the dehalohydroxylation is oriented substantially completely in the position para to the nitro moiety. Thus, such a process does not permit one to synthesize, under economically acceptable conditions, the 2-nitrohalophenols and the 2-nitropolyhalophenols. Accordingly, since said 2-nitrohalophenols and 2-nitropolyhalophenols are desirable intermediates in various syntheses of numerous commercial products, for example, certain biocidal agents, and since the polyhalonitrobenzenes themselves are compounds which can readily be prepared by the simple nitration of the polyhalobenzenes [which polyhalobenzenes themselves are readily available in substantial quantities on the open market], a serious need exists in the art for an alternative synthesis permitting of the preparation of these valuable 2-nitrohalophenols and 2-nitropolyhalophenols.

SUMMARY OF THE INVENTION

Therefore, it is a primary object of the present invention to provide a facile process for the preparation of the 2-nitrohalophenols.

It is a further object of the invention to provide a process for the preparation of the 2-nitrohalophenols by dehalohydroxylating a polyhalonitrobenzene precursor.

Yet another object of the invention is to provide a process for the preparation of the 2-nitrohalophenols by reacting a polyhalonitrobenzene with an hydroxyl rich saponification agent in an ortho orienting, organic solvent reaction medium.

Other objects, features and advantages of this invention will become more apparent to those skilled in the art from the detailed description of the invention which follows.

DETAILED DESCRIPTION OF THE INVENTION

The process of the subject invention is based upon the surprising discovery that the 2-nitrohalophenols [which "term," as utilized herein, is intended as inclusive of the 2-nitropolyhalophenols] can conveniently be prepared simply by dehalohydroxylating a polyhalonitrobenzene. More particularly, it has now been found that the 2-nitrohalophenols can conveniently be prepared by dehalohydroxylating a polyhalonitrobenzene which bears but a single halogen atom in either but not both of those molecular sites ortho to the nitro moiety borne by the precursor benzene compound. The dehalohydroxylation reaction according to the invention is effected by reacting the polyhalonitrobenzene compound with certain saponification agents in the presence of an ortho orienting organic solvent. And quite unexpectedly, it has been determined that the reactant polyhalonitrobenzenes can bear only a single halogen atom in either but not both of those positions ortho to the nitro group thereof. Indeed, it has also unexpectedly been determined that the presence of two halogen atoms ortho to the nitro group on the reactant polyhalonitrobenzene effects a substitution of the nitro moiety itself upon saponification. Surprisingly, however, the dehalohydroxylation according to the invention, and wherein but a single position ortho to the nitro group borne by the precursor polyhalonitrobenzene is occupied by a halogen atom, is essentially completely ortho oriented and which additionally does not adversely affect or provide for the substitution of the nitro group on the parent polyhalonitrobenzene.

The dehalohydroxylation of the polyhalonitrobenzenes [which optionally can be alkylated with an alkyl radical having from one to four carbon atoms] to prepare the desired 2-nitrohalophenols [which also optionally can be alkylated with a lower alkyl radical having from one to four carbon atoms] according to the invention, can conveniently be represented by the following reaction scheme:

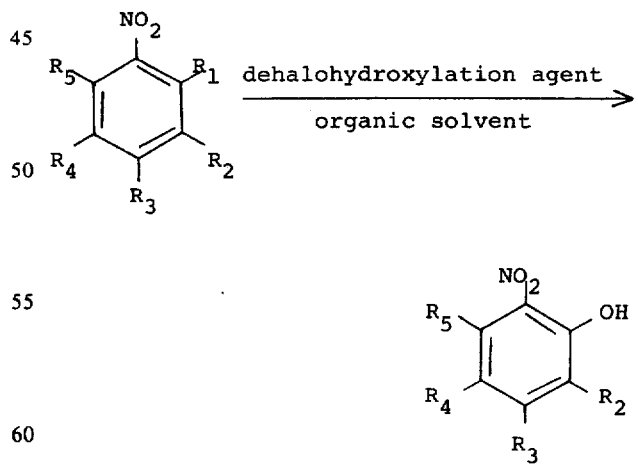

wherein $R_1$ is halo; $R_2$, $R_3$ and $R_4$ are each either hydrogen, halo or lower alkyl having from one to four carbon atoms; and $R_5$ is either hydrogen or lower alkyl having from one to four carbon atoms; with the proviso that at least one of $R_2$, $R_3$ and $R_4$ must be halo; and wherein halo is either chloro, bromo or fluoro.

The reactant polyhalonitrobenzenes of the above formula are generally well known materials, and all of same can conveniently be prepared by standard procedures for the nitration of polyhalobenzenes and polyhaloalkylbenzenes. Exemplary preferred polyhalonitrobenzenes are 2,3-dichloronitrobenzene, 2,4-dichloronitrobenzene, 2,5-dichloronitrobenzene, 2,3,4-trichloronitrobenzene, 2,3,5-trichloronitrobenzene, 2,4,5-trichloronitrobenzene and 2,3,4,5-tetrachloronitrobenzene. The fluoro and chloro analogs of the aforesaid exemplified preferred reactants can be utilized equally as well. Moreover, the mixed polyhalonitrobenzenes, such as the various chlorofluoronitrobenzenes and the chlorobromonitrobenzenes, too can readily be saponified under the conditions of the present invention.

The saponification [or dehalohydroxylation] agents utilized in the dehalohydroxylation according to the invention are advantageously selected from among the alkali metal hydroxides, preferably the lithium, sodium or potassium hydroxides, or the alkali metal alcoholates, especially the lower alcoholates, or any other hydroxyl rich compound capable of effecting the substitution of a halogen atom by a hydroxyl group. The particular saponification agent selected is thus not critical and, therefore, virtually any hydroxyl rich saponification agent suitable for the hydroxylation of aryl halides may be utilized to accomplish the replacement reaction, so long as such hydroxyl rich compound selected is capable of undergoing the desired reaction under the reaction conditions according to the instant process.

The presence of an organic solvent in the reaction mixture is a fundamental and critical feature of the process according to the invention, and, as above outlined, the organic solvent [herein deemed the "ortho orienting liquid organic reaction medium"] is determinative of the degree of ortho substitution attainable according to the reaction method. In order to obtain a satisfactory degree of ortho substitution, e.g., one permitting of commercial and economic feasibility, an organic solvent is selected which has a dielectric constant not in excess of 25 at room temperature [20°–25°C.]. Moreover, in order to most effectively utilize the discovered relationship between the dielectric constant of the reaction medium and the degree of ortho substitution, and to facilitate the reaction process, it is most preferred that the organic reaction medium serve as a solvent for the various reactants. Preferred solvents comprise the low molecular weight or lower tertiary alcohols, and among these there may be mentioned tertiary butanol and tertiary amyl alcohol. Furthermore, also according to a specific embodiment of the process of the invention, a mixture of two or more solvents may be utilized, only one of which need serve as the solvent for the reactants. Exemplary co-solvents are, for instance, dioxane and tetrahydrofuran.

The molar ratio between the saponification agent and the reactant polyhalonitrobenzene is not critical and thus can vary over wide limits. Preferably, however, the molar ratio varies between about 1/1 and 20/1, and most preferably between about 3/1 and 10/1.

And the initial concentration of the saponification agent in the reaction mixture too is not a particularly critical feature of the invention process and also can vary over wide limits. Generally, however, such initial concentration is in the range of between about 0.5 and 0.8 moles of saponification agent per liter of solvent. In point of fact, this upper limit can even be said to be imposed by technological and economic restraints. Similarly, the concentration of the polyhalonitrobenzene reactants is not critical, such concentration preferably being in the range of between about 0.05 and 1 mole, most preferably in the range of between about 0.1 and 0.5 moles per liter of solvent.

The reaction process is advantageously carried out by maintaining the reaction mixtures at a temperature generally between about 100° and 250°C., and preferably between about 140° and 170°C.; most preferably, the reaction and the aforesaid temperatures are permitted to continue for a period of time sufficient to allow substantially all of the polyhalonitrobenzene starting material to be substantially completely converted to the desired product. In the event that the boiling point of the ortho orienting liquid organic reaction medium utilized in the reaction mixture is lower than the desired reaction temperature, then the process is carried out under sufficient pressure to maintain the reaction mixture in the liquid phase.

Numerous methods for the separation and isolation of the desired product from the reaction mixture are available. The following has been found to be particularly suitable, namely, upon cooling the reaction mixture, the same is first neutralized with a strong acid, preferably a non-oxidizing mineral acid, such as hydrochloric acid, and then the organic solvent(s) is simply evaporated therefrom. Under such conditions, the desired product next precipitates. It is then filtered. The remainder of the 2-nitrohalophenol in solution, in the aqueous mixture, is conveniently extracted by means of an organic solvent such as chloroform. The precipitated phenol is added to the recovered organic phase wherein it dissolves. The resultant solution is treated with vegetable activated carbon and the solvent is evaporated therefrom. Pure 2-nitrohalophenol is thence recovered.

In order to further illustrated the present invention and the advantages thereof, the following specific examples are given, it being understood that the same are intended only as illustrative and in no wise limitative.

EXAMPLE 1

Into a 100cm³ reaction bomb, 1,3 g of 2,3,4,5-tetrachloronitrobenzene (0.005 mole), 0.6 g of sodium hydroxide (0.015 mole) and 50 cm³ of tertiary butanol were successively poured.

The foregoing mixture was heated at 155°C. for 2 hours, then cooled and poured into an aqueous solution of hydrochloric acid. The tertiary butanol was next evaporated, effecting the precipitation of a red solid which was recovered by filtration. The aqueous filtrate was then extracted with chloroform. The precipitate was dissolved in the chloroform used for the extraction, and the solution was passed over vegetable activated carbon. After evaporation of the chloroform, there were recovered from the yellow solution 0.89 g of 4,5,6-trichloro-2-nitrophenol (yield, 78%).

EXAMPLE 2

Under conditions identical to those of Example 1, 1.12 g of 2,4,5-trichloronitrobenzene was converted into 0.75 g of 4,5-dichloro-2-nitrophenol (yield, 77%).

EXAMPLES 3–43

The following products are obtained from the following corresponding reactants by the same manner as in Examples 1 and 2:

| Reactant | Product |
| --- | --- |
| 2,3-difluoronitrobenzene | 2-nitro-6-fluorophenol |
| 2,4-difluoronitrobenzene | 2-nitro-5-fluorophenol |
| 2,5-difluoronitrobenzene | 2-nitro-4-fluorophenol |
| 2,3,4-trifluoronitrobenzene | 2-nitro-5,6-difluorophenol |
| 2,3,5-trifluoronitrobenzene | 2-nitro-4,6-difluorophenol |
| 2,4,5-trifluoronitrobenzene | 2-nitro-4,5-difluorophenol |
| 2,3,4,5-tetrafluoronitrobenzene | 2-nitro-4,5,6-trifluorophenol |
| 2,3-dichloro-4-ethylnitrobenzene | 2-nitro-6-chloro-5-ethylphenol |
| 2,3-dichloro-5-methylnitrobenzene | 2-nitro-6-chloro-4-methylphenol |
| 2,4-dichloro-3-propylnitrobenzene | 2-nitro-5-chloro-6-propylphenol |
| 2,4-dichloro-5-ethylnitrobenzene | 2-nitro-5-chloro-4-ethylphenol |
| 2,3-dichloro-4-methyl-5-ethylnitrobenzene | 2-nitro-6-chloro-5-methyl-4-ethylphenol |
| 2,4-dichloro-3,5-dimethylnitrobenzene | 2-nitro-5-chloro-4,6-dimethylphenol |
| 2,3,5-trichloro-4-butylnitrobenzene | 2-nitro-4,6-dichloro-5-butylphenol |
| 2,3,4-trichloro-5-ethylnitrobenzene | 2-nitro-5,6-dichloro-4-ethylphenol |
| 2,3-dibromonitrobenzene | 2-nitro-6-bromophenol |
| 2,4-dibromonitrobenzene | 2-nitro-5-bromophenol |
| 2,5-dibromonitrobenzene | 2-nitro-4-bromophenol |
| 2,3,4-tribromonitrobenzene | 2-nitro-5,6-dibromophenol |
| 2,3,5-tribromonitrobenzene | 2-nitro-4,6-dibromophenol |
| 2,4,5-tribromonitrobenzene | 2-nitro-4,5-dibromophenol |
| 2,3,4,5-tetrabromonitrobenzene | 2-nitro-4,5,6-tribromophenol |
| 2,3-difluoro-4-methylnitrobenzene | 2-nitro-6-fluoro-5-methylphenol |
| 2,3-difluoro-5-butylnitrobenzene | 2-nitro-6-fluoro-4-butylphenol |
| 2,4-difluoro-3-ethylnitrobenzene | 2-nitro-5-fluoro-6-ethylphenol |
| 2,4-difluoro-5-propylnitrobenzene | 2-nitro-5-fluoro-4-propylphenol |
| 2,3-difluoro-4,5-dimethylnitrobenzene | 2-nitro-6-fluoro-4,5-dimethylphenol |
| 2,3,5-trifluoro-4-propylnitrobenzene | 2-nitro-4,6-difluoro-5-propylphenol |
| 2,3,4-trifluoro-5-ethylnitrobenzene | 2-nitro-5,6-difluoro-4-ethylphenol |
| 2,3-dibromo-4-propylnitrobenzene | 2-nitro-6-bromo-5-propylphenol |
| 2,4-dibromo-3-methylnitrobenzene | 2-nitro-5-bromo-6-methylphenol |
| 2,5-dibromo-3-ethylnitrobenzene | 2-nitro-4-bromo-6-ethylphenol |
| 2,3,4-tribromo-5-methylnitrobenzene | 2-nitro-5,6-dibromo-4-methylphenol |
| 2-chloro-3-fluoronitrobenzene | 2-nitro-6-fluorophenol |
| 2,3-dichloro-5-fluoronitrobenzene | 2-nitro-6-chloro-4-fluorophenol |
| 2,3,5-trichloro-4-fluoronitrobenzene | 2-nitro-4,6-dichloro-5-fluorophenol |
| 2-chloro-4-fluoro-5-methylnitrobenzene | 2-nitro-5-fluoro-4-methylphenol |
| 2-chloro-4-bromonitrobenzene | 2-nitro-5-bromophenol |
| 2,4-dichloro-3-bromonitrobenzene | 2-nitro-5-chloro-6-bromophenol |
| 2,3,4-trichloro-5-bromonitrobenzene | 2-nitro-5,6-dichloro-4-bromophenol |
| 2,3-dichloro-5-bromo-4-ethylnitrobenzene | 2-nitro-6-chloro-4-bromo-5-ethylphenol |

While the invention has been described and illustrated with reference to certain preferred embodiments thereof, those skilled in the art will appreciate that various changes, modifications and substitutions therein can be made without departing from the spirit of the invention. It is intended, therefore, that the invention be limited only by the scope of the claims which follow.

What is claimed is:

1. In a process for the preparation of the 2-nitrohalophenols having the structural formula:

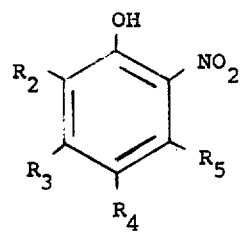

comprising reacting a polyhalonitrobenzene having the structural formula:

with a dehalohydroxylation agent, wherein the above formulae $R_1$ is halogen; $R_2$, $R_3$ and $R_4$ are independently selected from the group consisting of hydrogen, halogen and lower alkyl having from one to four carbon atoms; and $R_5$ is selected from the group consisting of hydrogen and lower alkyl having from one to four carbon atoms; with the proviso that at least one of $R_2$, $R_3$ and $R_4$ must be halogen; and wherein the halogen is selected from the group consisting of chlorine, fluorine and bromine, the improvement comprising conducting said reaction in an ortho orienting liquid organic reaction medium comprising a tertiary alcohol having a dielectric constant not in excess of 25 determined at approximately 25°C.

2. The process as defined by claim 1, wherein the ortho orienting liquid organic reaction medium has a dielectric constant less than 25 determined at 25°C.

3. The process as defined by claim 2, wherein the ortho orienting liquid organic reaction medium is a solvent for the process reactants.

4. The process as defined by claim 1, said tertiary alcohol is selected from the group consisting of tertiary butanol and tertiary amyl alcohol.

5. The process as defined by claim 3, wherein the ortho orienting liquid organic reaction medium further comprises a co-solvent.

6. The process as defined by claim 5, wherein the co-solvent is selected from the group consisting of dioxane and tetrahydrofuran.

7. The process as defined by claim 3, wherein the dehalohydroxylation agent is a saponification agent.

8. The process as defined by claim 7, wherein the saponification agent is selected from the group consisting of an alkali metal hydroxide and an alkali metal lower alcoholate.

9. The process as defined by claim 8, wherein the saponification agent is an alkali metal hydroxide selected from the group consisting of lithium, sodium and potassium hydroxide.

10. The process as defined by claim 7, wherein the molar ratio between the saponification agent and the polyhalonitrobenzene reactant ranges from between about 1/1 to 20/1.

11. The process as defined by claim 10, wherein the initial concentration of the saponification agent in the reaction mixture ranges from between about 0.5 and 0.8 mole per liter of solvent, and the concentration of polyhalonitrobenzene reactant ranges from between about 0.05 and 1 mole per liter of solvent.

12. The process as defined by claim 11, wherein the molar ratio between the saponification agent and the polyhalonitrobenzene reactant ranges from between about 3/1 to 10/1, the initial concentration of polyhalonitrobenzene reactant ranges from between about 0.1 and 0.5 mole per liter of solvent, and the reaction is conducted at an elevated temperature of between about 100° and 250°C.

13. The process as defined by claim 7, wherein the polyhalonitrobenzene reactant is selected from the group consisting of 2,3-dichlornitrobenzene, 2,4-dichloronitrobenzene, 2,5-dichloronitrobenzene, 2,3,4-trichloronitrobenzene, 2,3,5-trichloronitrobenzene, 2,4,5-trichloronitrobenzene and 2,3,4,5-tetrachloronitrobenzene.

14. The process as defined by claim 1, wherein said ortho orienting liquid organic reaction medium comprises a substantially anhydrous tertiary alcohol.

* * * * *